H. H. Elwell,
Knob Attachment,
Nº 15,332. Patented July 15, 1856.
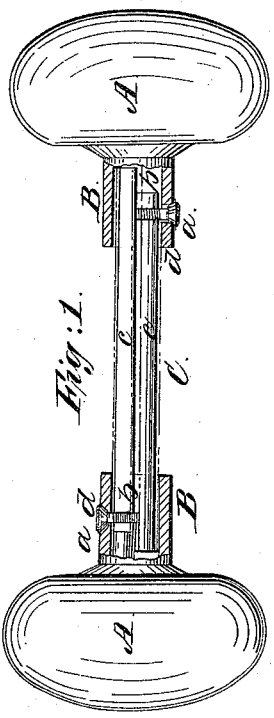
Fig: 1.
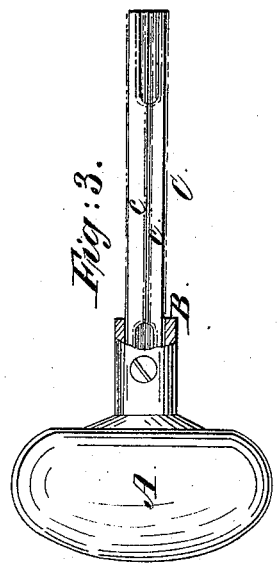
Fig: 3.
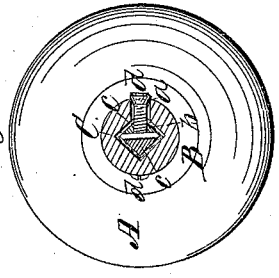
Fig: 2.
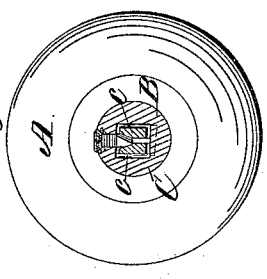
Fig: 4.

UNITED STATES PATENT OFFICE.

HENRY H. ELWELL, OF MERIDEN, CONNECTICUT.

DOOR-KNOB.

Specification of Letters Patent No. 15,332, dated July 15, 1856.

*To all whom it may concern:*

Be it known that I, HENRY H. ELWELL, of Meriden, in the county of New Haven and State of Connecticut, have invented a new and useful Improvement in Extension Door-Knobs; and I do hereby declare that the following is a full, clear, and exact description of the same, reference being had to the accompanying drawings, forming part of this specification, in which—

Figure 1, is a vertical longitudinal section and partial elevation of a pair of extension door knobs, made after my invention. Fig. 2, is a transverse section through the shank of one of the knobs and the spindle. Fig. 3, is an elevation and partial section of a knob and spindle at present in use. Fig. 4, is a transverse section of the same.

My invention relates to the fastening of the knobs on the divided extension spindle, and is designed as an improvement on the method of effecting the same patented by Nathan Benham, on the 8th of April, 1856.

The nature of my said improvement consists in dividing the spindle diagonally instead of in a line parallel with its sides and providing a screw hole in one end of each of the sections of the spindle, at right angles to the division line of the spindle. By thus dividing the spindle, as may be evident, all four of its sides, when it is expanded by the screws, are caused to bear laterally against the sides of the socket of the shank of the knobs, and thereby fasten the knobs firmly on the spindle, in such a manner that there is no possibility of their ever falling off, no matter how much the spindle is extended, whereas, when the spindle is divided in a line parallel with its sides by means of a taper slot, and pointed screw, only three of its sides are caused to bear against the sides of the socket of the knob, and consequently most of the strain and wear comes on the taper point of the screw, which soon wears away and allows the knobs to work loose, and fall off the spindle. Another disadvantage resulting from thus dividing the spindle is, that the screw holes for the expanding screws, have to be formed in cast iron shanks, instead of the wrought iron spindle. Dividing the spindle diagonally also lessens the expense of manufacture, as the labor of finishing the taper slots in the spindle, and the shaping of the screws to fit the same is saved.

To enable others skilled in the art to make and use my invention, I will proceed to describe it more minutely.

A, A, represent two knobs, made of brass, porcelain, or other material, with either a metallic, or porcelain shank B, in which a plain hole *a*, for a screw to pass through is provided.

C, is the spindle, made in two parts *c, c*, being divided diagonally, as shown in Fig. 2 instead of parallel, as shown in Fig. 4. *b*, is a screw hole cut entirely through one end of each of the sections, and *d*, is a screw which passes through the hole *a*, of the shank and screws into the screw hole *b*, as shown in Figs. 1, and 2. By priming the screw hole in the wrought iron spindle, instead of the cast iron shank, the thread of the same is not so liable to break out.

It will be seen from the drawing that the screw holes *b, b*, are so situated, that one comes on one side of the spindle, and the other on the opposite side, they require to be so placed, that one section of the spindle may be moved independent of another, and in an opposite direction, when it is desired to extend the spindle, as illustrated in Fig. 2.

By examining Figs. 3, and 4, of the drawing, the method of fastening the knobs on the spindle, patented by Benham, will be seen. In these views the black lines show the spindle as it appears before it is expanded, and the red lines, after it has been expanded.

To fasten the knobs on the spindle after my invention; the two sections of the spindle *c, c*, are put together, and the ends of the same inserted into the socket of the knob; the screws *d, d*, screwed in until the sections are forced apart thereby, in opposite directions, in a manner to cause the four sides of the spindle to bind laterally against the four sides of the socket of the knob shanks, as illustrated by red lines, and thereby firmly lock the knobs and spindle together. To extend the spindle, it is simply necessary to partly draw out the screws, and then move one of the sections *c*, in the direction of the arrow 1, and the other in the direction of the arrow 2, this being done the screws are screwed in again, as before described, and the sides of the spindle caused to bear flat against the sides of the socket, and consequently, although the bearing of one section on each shank is short, confine the knob as securely as if the bearing were longer.

I do not claim the spindle divided parallel with its sides, as this is very old, nor the expanding of the same by means of a taper slot, and pointed screw, as this is covered by Letters Patent granted to Nathan Benham, in April 1856, but What I do claim as my invention, and as new and useful therein, and for which I desire to secure Letters Patent, is, Dividing the spindle diagonally, and providing a screw hole $b$, in one end of each of its sections $c$, $c$, at right angles to the division line, substantially as, and for the purpose herein set forth.

HENRY H. ELWELL.

Witnesses:
ALBERT FOSTER,
HIRAM FOSTER.